Figure 1:
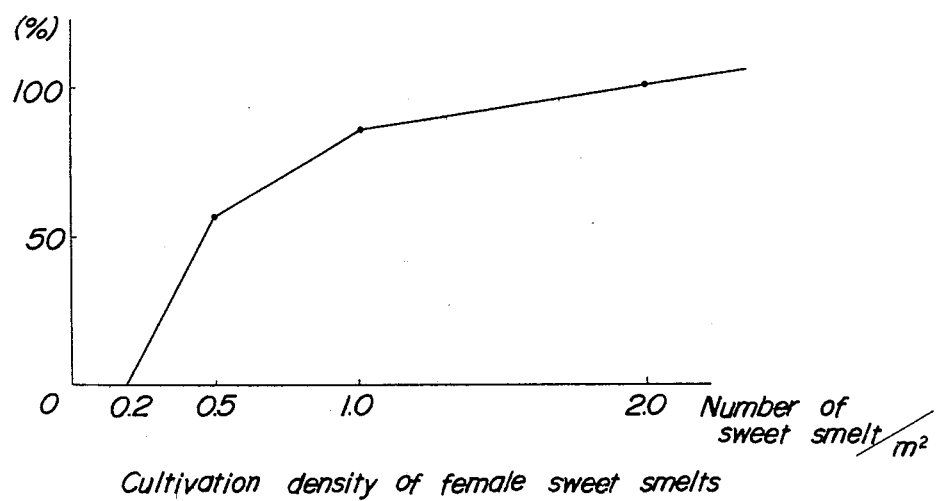

United States Patent [19]
Yamada

[11] 3,886,903
[45] June 3, 1975

[54] METHOD OF SPAWNING AND CULTURING OF SWEET SMELTS

[76] Inventor: Toshiro Yamada, 32-3, Deki-machi, Anan, Japan

[22] Filed: Jan. 17, 1974

[21] Appl. No.: 434,002

[30] Foreign Application Priority Data
Feb. 8, 1973 Japan............................... 48-15826

[52] U.S. Cl. .................................................. 119/3
[51] Int. Cl............................................ A01k 61/00
[58] Field of Search..................................... 1-19/3, 5

[56] References Cited
UNITED STATES PATENTS
3,765,372   10/1973   Moe, Jr. et al. ........................ 119/3
3,777,709   12/1973   Anderson et al. ...................... 119/3

Primary Examiner—Louis G. Mancene
Assistant Examiner—J. N. Eskovitz
Attorney, Agent, or Firm—Browdy & Neimark

[57] ABSTRACT

A method of spawning and culturing of sweet smelts in which spawning and fertilization of large quantities of eggs of sweet smelts can be accomplished in a very short time at a high spawning ratio and a high incubation ratio while saving labors and effort is disclosed. This method comprises cultivating hormone-administered mature female sweet smelts at a cultivation density of at least 0.5 sweet smelt per square meter together with mature male sweet smelts in a culture pond in which a gravel spawning bed is formed and water is circulated, the number of male sweet smelts being equal to or larger than, the number of female sweet smelts, to thereby effect spawning and fertilization, and separating the mature sweet smelts after completion of spawning and incubating spawned eggs.

7 Claims, 2 Drawing Figures

METHOD OF SPAWNING AND CULTURING OF SWEET SMELTS

In breeding and culturing fry of sweet smelts for stocking or cultivation in large quantities on an industrial scale, in view of the facility in disinfection of fertilized eggs and in feeding of alevins or the prevention of cannibalism (fry's habit of eating eggs), it is desired that the growth of incubated fry be maintained at an almost constant level. For this purpose, it is necessary that large quantities of eggs be incubated in a time as short as possible.

However, in the case of natural incubation it is impossible to collect large quantities of fertilized eggs or incubated alevina in a short time, and it is also impossible to allow large quantities of sweet smelts to spawn in a culture pond. Therefore, spawning and fertilization of eggs are now conducted artificially, and artificially fertilized eggs are incubated.

The number of eggs spawned by one female sweet smelt is about 40,000 in the case of a body weight of 50g and about 80,000 in the case of a body weight of 100g. However, according to the above artificial incubation method, only about 5,000 to about 10,000 are successfully collected per female sweet smelt. Moreover, the period for obtaining mature sweet smelts is much limited and it is now difficult to obtain large quantities of mature sweet smelts. In addition, the above method is defective in that operations of collection and fertilization of eggs require much effort.

It has recently been tried to apply a hormone to cultured fish and conduct artificial spawning. However, as is apparent from data shown in Table 1, the egg fertilization ratio and egg incubation ratio vary greatly in individual female sweet smelts, and the overall egg fertilization ratio and egg incubation ratio are as low as about 50% and about 30%, respectively. Further, the ratio of appearance of weak fry and deformed fry is extremely high.

Table 1

Amount of collected eggs and egg fertilization ratio in hormone-injected sweet smelts

| Fish No. | Amount (g) of Collected Eggs | Egg Fertilization Ratio (%) |
| --- | --- | --- |
| 1 | 6.4 | 60 |
| 2 | 6.5 | 36 |
| 3 | 6.5 | 86.5 |
| 4 | 6.3 | 85.3 |
| 5 | 6.1 | 84.2 |
| 6 | 10.0 | 95.6 |
| 7 | 7.3 | 86.9 |
| 8 | 2.3 | 17.2 |
| 9 | 7.8 | 0 |
| 10 | 0.7 | 0 |
| 11 | 5.6 | 65.2 |
| 12 | 10.6 | 0 |
| 13 | 6.0 | 27.2 |
| 14 | 5.0 | 3.6 |
| 15 | 10.8 | 96.6 |
| average | 6.5 | 49.3 |

In view of the above-mentioned status of the art, I have made investigations to develop a method which will permit allowing large quantities of sweet smelts to spawn in a short time without conducting artificial fertilization or incubation, and as a result it has now been found that even in the case of natural spawning, large quantities of eggs can be spawned and fertilized in a short time if a spawning environment satisfying the following requirements is provided:

1. A spawning bed is formed in a culture pond.
2. A hormone is administered to sweet smelts.
3. The cultivation density of female sweet smelts is maintained at a level of at least 0.5 sweet smelt per square meter.

Based on the foregoing finding, I have now completed this invention.

In accordance with this invention, there is provided a method of spawning and culturing of sweet smelts which comprises cultivating hormone-administered mature female sweet smelts at a cultivation density of at least 0.5 sweet smelt per square meter together with mature male sweet smelts in a culture pond in which a spawning gravel bed is formed and water is circulated, the number of male sweet smelts being equal to, or larger than, the number of female sweet smelts, to thereby effect spawning and fertilization, and separating the mature sweet smelts after completion of spawning and incubating the spawned eggs.

Figure 2:
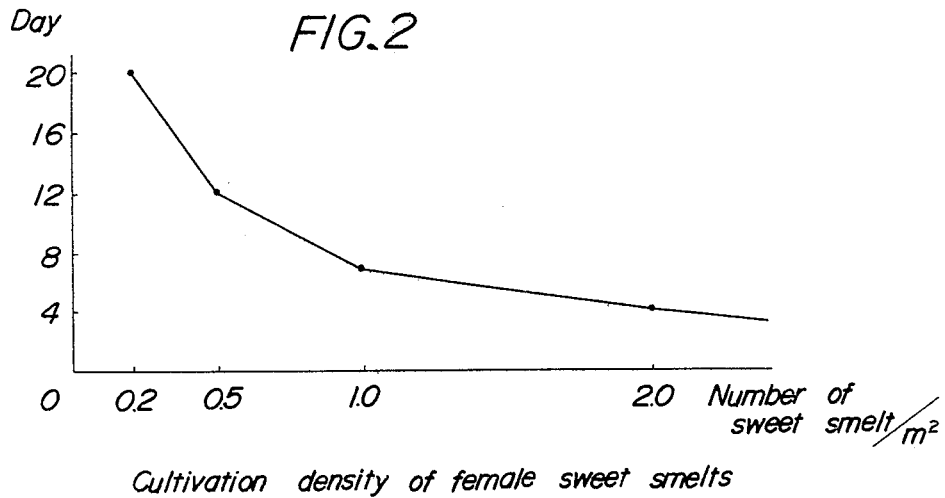

This invention will now be illustrated by reference to the accompanying drawing, in which:

FIG. 1 is a curve illustrating the relation between the cultivation density of female sweet smelts and the spawning ratio; and FIG. 2 is a curve illustrating the relation between the cultivation density of female sweet smelts and the number of days required for spawning.

As pointed out above, even when a hormone is applied to female sweet smelts, there are great differences in the amount of collected eggs and the egg fertilization ratio among individual sweet smelts. Accordingly, it is seen that the spawning and fertilization cannot be promoted in sweet smelts by a greater application of a hormone. As a result of observations of the habits of sweet smelts and various experiments, it has been found that the spawning is closely connected with the provision of a spawning bed and the cultivation density and that in order to conduct spawning in sweet smelts effectively, it is necessary to provide a spawning bed and adjust the cultivation density appropriately.

The following comparative experiments have been conducted. Namely, 50 of hormone-administered female sweet smelts were cultivated in a culture pond provided with a spawning gravel bed, and similarly, 50 of hormone-administered female sweet smelts were cultivated in a culture pond composed of concrete and provided with no spawning bed. The number of male sweet smelts cultivated was 100 in each pond. The average body weight of tested fish was 65g and the average ratio of the weight of the genital gland to the body weight was 20.3%. At the start of the experiment, 200 MU of puberogen was applied as a hormone and after 2 days 200 MU of puberogen was similarly applied. The change of the number of spawning female sweet smelts was pursued with the lapse of time to obtain results shown in Table 2, from which it is seen that the spawning effect is greatly promoted by the provision of a spawning bed.

Table 2

Spawning-Promoting Effect of Spawning Bed

| | Pond Provided with Spawning Bed | Pond Not Provided with Spawning Bed |
| --- | --- | --- |
| Number of Spawning Sweet Smelts | | |
| number of passing days | | |
| 0 | — | — |

Table 2-Continued

| | Spawning-Promoting Effect of Spawning Bed | |
|---|---|---|
| | Pond Provided with Spawning Bed | Pond Not Provided with Spawning Bed |
| Number of Spawning Sweet Smelts | | |
| 1 | — | — |
| 2 | 14 | 3 |
| 3 | 21 | 14 |
| 4 | 14 | 3 |
| 5 | — | — |
| Total of Spawning Sweet Smelts | 49 | 20 |
| Spawning Ratio (%) | 98 | 40 |

In the case of cultivation in a pond provided with a spawning bed, the ratio of the ovary weight to the body weight was determined before and after spawning to obtain the results shown in Tables 3 and 4, from which it is seen that the ratio of the weight of spawned eggs to the body weight is about 18%, which corresponds to about 50,000 eggs per female sweet smelt, and that the amount of spawned eggs is several times the amount of spawned eggs obtained by the conventional artificial spawning method.

Table 3

Relation between Ovary Weight and Body Weight before Spawning

| Fish No. | Body Weight (g) (BW) | Ovary Weight (g) (GW) | GW/BW (%) |
|---|---|---|---|
| 1 | 70.0 | 17.0 | 24.2 |
| 2 | 62.0 | 13.0 | 20.9 |
| 3 | 58.0 | 15.1 | 26.0 |
| 4 | 62.0 | 12.9 | 20.8 |
| 5 | 63.0 | 14.0 | 22.7 |
| 6 | 68.0 | 16.7 | 24.5 |
| 7 | 60.0 | 12.1 | 20.2 |
| 8 | 66.0 | 15.5 | 23.5 |
| 9 | 84.0 | 21.8 | 25.9 |
| 10 | 61.0 | 13.8 | 22.6 |
| average | 65.4 | 15.2 | 23.1 |

Table 4

| Fish No. | Body Weight (g) (BW) | Ovary Weight (g) (GW) | GW/BW (%) | |
|---|---|---|---|---|
| 1 | 74 | 4.6 | 6.2 | |
| 2 | 82 | 4.9 | 5.9 | |
| 3 | 70 | 2.6 | 3.7 | |
| 4 | 54 | 3.5 | 6.4 | |
| 5 | 74 | 4.4 | 5.9 | |
| 6 | 72 | 3.0 | 4.1 | |
| 7 | 70 | 3.6 | 5.1 | |
| 8 | 64 | 9.5 | 14.8 | (parts of eggs left) |
| 9 | 54 | 1.9 | 3.5 | |
| 10 | 54 | 3.0 | 5.5 | |
| 11 | 70 | 2.5 | 3.5 | |
| 12 | 56 | 6.4 | 11.4 | (parts of eggs left) |
| 13 | 64 | 3.6 | 5.6 | |
| 14 | 60 | 2.8 | 4.6 | |
| 15 | 82 | 4.0 | 4.9 | |
| 16 | 74 | 3.0 | 4.1 | |
| 17 | 78 | 3.7 | 4.7 | |
| 18 | 70 | 3.0 | 4.3 | |
| 19 | 66 | 4.2 | 6.4 | |
| 20 | 70 | 4.2 | 6.0 | |
| average | 68.7 | 3.5 | 4.02 | |

As is illustrated in FIGS. 1 and 2, when the cultivation density of female sweet smelts is lower than 0.5 sweet smelt per square meter, the spawning ratio is extremely bad, and it takes more than 10 days to complete the spawning. In contrast, when the cultivation density of female sweet smelts is at least 0.5 sweet smelt per square meter, the spawning ratio is extremely heightened and the spawning is completed in a much more limited number of days. Especially good results are obtained when the cultivation density is 2 to 3 female sweet smelts per square meter.

It is believed that at such optimum cultivation density, the spawning activity of sweet smelts is stimulated and promoted by the generative action of other sweet smelts, and they heighten aging of immature eggs after discharge of over-mature eggs and spawn concentratedly mature eggs.

As is apparent from the foregoing, in this invention the spawning activity of sweet smelts is stimulated and activated by utilizing habits of sweet smelts effectively and large quantities of eggs can be naturally spawned and fertilized in a very short time. Therefore, it is made possible to obtain large quantities of fry uniform in size by incubation and culture. Further, since eggs are spawned concentratedly within a short period of time, disinfection of fertilized eggs can be greatly facilitated and an undesired phenomenon of fertilized eggs being eaten by parent sweet smelts can be highly prevented. Moreover, Since the growth is uniform in the incubated alevins or fry, feeding and other cultivation operations can be greatly facilitated. Thus, according to this invention, large quantities of fry can be easily obtained while saving labors or hands and this invention is very advantageous over the conventional methods.

Either natural or cultured sweet smelts can be used as parent sweet smelts in the method of this invention, but it is preferred that the spawning period be adjusted by an actinic treatment depending on the season and the degree of growth. It is necessary that male sweet smelts are cultivated in the number equal to, or larger than, the number of female sweet smelts cultivated at a density of at least 0.5 sweet smelt per square motor. Especially good results are obtained when the number of male sweet smelts is 2 to 3 times the number of female sweet smelts. In order to prevent fertilized eggs from being eaten by parent fishes, it is necessary to separate parent fishes as soon as possible after spawning and fertilization.

In principle, 200 MU (mouce unit) of puberogen for animals is injected twice within an interval of two days. The hormone can be administered to not only female sweet smelts but also male sweet smelts, and it is preferred to administer the hormone to both female and male sweet smelts.

A spawning gravel bed is formed in a culture pond, and it is preferred that the depth of the pond be changed by indenting parts of the pond bottom. Since stagnant water is not suitable for spawning, it is preferred that fresh water is always supplied and a part of the water in the pond is always circulated by means of a pump or the like to form streams running at a rate of 50 to 500 cm/sec.

EXAMPLE

At the bottom of a pond of a square form of a side of a m there were disposed gravels of not so fine sizes and the water depth was maintained at 50 cm. A part of the water in the culture pond was circulated to give a flow rate of about 3 m/sec by means of a pump while supplying fresh water.

100 of female sweet smelts produced at Biwako and subjected to the actinic treatment (cultivation density=2.76 sweet smelts per square meter; average body weight=80g; average ratio of the genital weight=20%), and 300 of male sweet smelts were cultivated in this culture pond. 200 mouce units of puberogen for animals was administered to female sweet smelts twice with an interval of 2 days.

Spawning and fertilization of eggs were caused in the cultivated sweet smelts, and when 5 days had passed, the spawning was completed. At this point, parent fishes were withdrawn from the pond. The incubation of fertilized eggs was completed within 2 weeks.

32 of female sweet smelts spawned on the second day from the first hormone application day and 65 of female smelts spawned at the fourth day from the first hormone application day (the overall spawning ratio being 97%). The estimate number of spawned eggs was about 4,000,000 (45,000 per sweet smelt) and the estimate number of incubated eggs (alevins) was about 3,000,000.

What is claimed is:

1. A method of spawning and culturing sweet smelts comprising the steps of:
   providing a culture pond having a surface with a desired surface area and a gravel spawning bed;
   circulating water through said culture pond;
   placing hormone-administered mature female sweet smelts in said culture pond such that the cultivation density of said female sweet smelts is at least 0.5 female sweet smelt per square meter of said surface area;
   placing mature male sweet smelts in said culture pond, with the number of said male sweet smelts being at least equal to the number of said female sweet smelts;
   allowing said male and female sweet smelts to spawn and fertilize eggs;
   separating said male and female sweet smelts from said eggs; and
   incubating said eggs.

2. A method according to claim 1 wherein the number of said male sweet smelts is 2 to 3 times the number of said female sweet smelts.

3. A method according to claim 1 further including the step of subjecting said female sweet smelts to an actinic treatment prior to the step of placing said male sweet smelts in said culture pond.

4. A method according to claim 1 wherein the cultivation density of said female sweet smelts is 2 to 3 sweet smelts per square meter of said surface area.

5. A method according to claim 1 further including the step of administering a hormone to said male sweet smelts prior to the step of placing said male sweet smelts in said culture pond.

6. A method according to claim 1 wherein said circulation of water is accomplished by circulating water to form streams running through said culture pond at a rate of 50 to 500 cm/sec.

7. A method according to claim 1 wherein said hormone-administered female smelts are administered puberogen in a dosage of about 200 mouce units at two separate times with an interval of 2 days therebetween.

* * * * *